July 11, 1939.  W. E. WEST  2,165,991
ART OF MAKING HOLLOW-HANDLE FLATWARE
Filed March 22, 1937
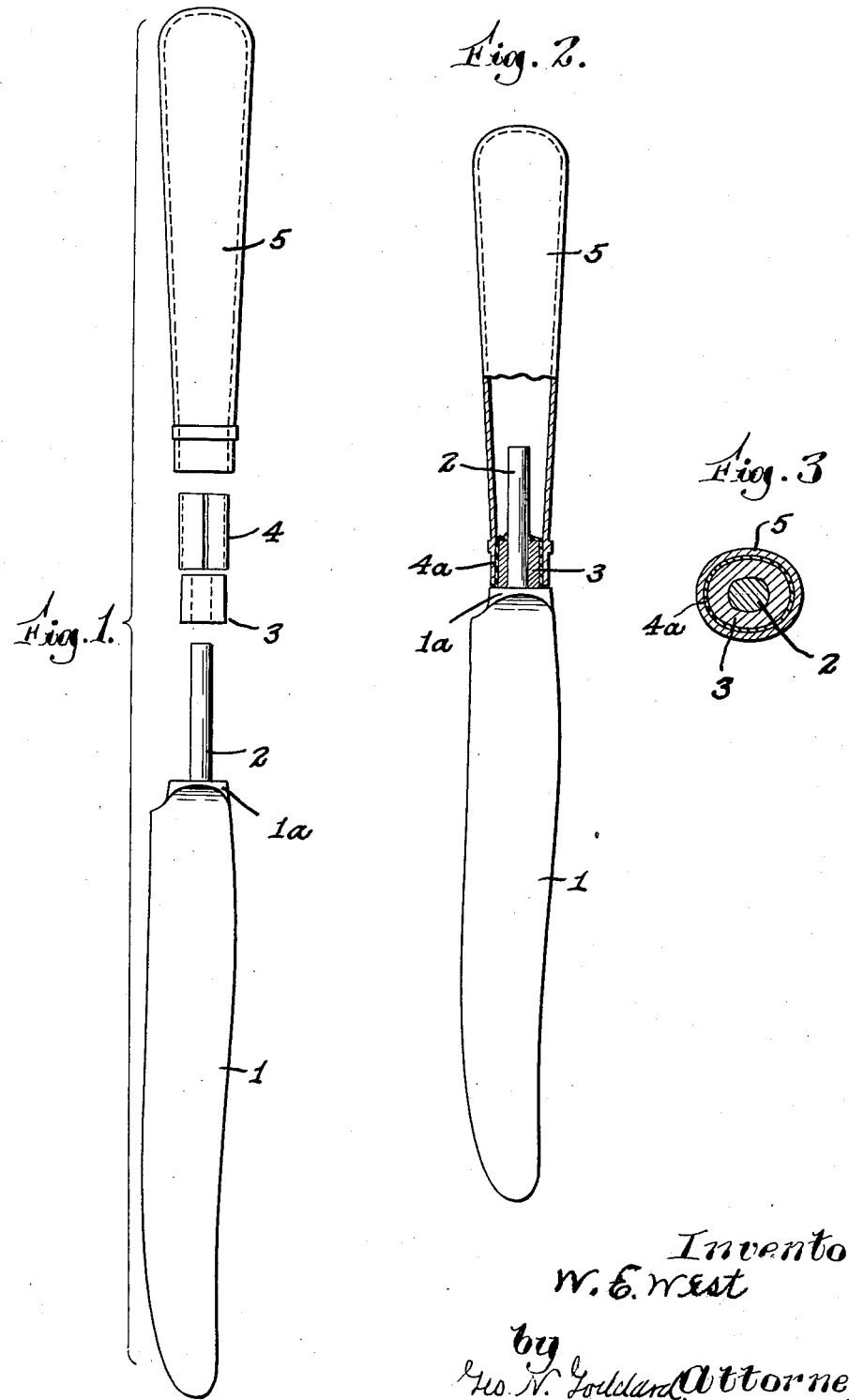
Inventor
W. E. West
by
Geo. N. Goddard, Attorney Patented July 11, 1939

2,165,991

UNITED STATES PATENT OFFICE 2,165,991

ART OF MAKING HOLLOW-HANDLE FLATWARE

William E. West, North Attleboro, Mass., assignor to R. Blackinton & Co., North Attleboro, Mass., a co-partnership Application March 22, 1937, Serial No. 132,272

1 Claim. (Cl. 76—106)

This invention relates to an improvement in the manufacture of hollow-handle flatware, such as knives or forks, particularly table knives, in which a handle of hollow metal is secured to the service member or blade, whether knife blade or fork, that is provided with a projecting tang or extension forming an attaching member for securing the handle to the article.

Heretofore it has been the usual practice when attaching a hollow handle of sterling silver or silver plate to a steel blade, whether knife blade or carving fork blade, to fill or partly fill the hollow handle with a very substantial quantity of fusible solder, usually in pieces or strips, after which the shank of the blade or service member is inserted inside the open end of the handle until the open end of the handle abuts against a shoulder of the flange of the blade and while the parts are held in such relation the solder is fused by subjecting the handle to a fusing temperature, thereby causing the solder to flow around the shank or tang and fill the intervening space between the elongated tang and the surrounding portion of the handle, thus forming a soft metal matrix or filling for the handle in which the shank is imbedded.

Such construction is objectionable for several reasons. The mass of solder required makes the handle very heavy and unbalanced; the solder itself is not firm enough to completely resist heavy stresses, so that in time the tangs tend to become loose as the shank imbedded in the mass of solder is of comparatively small diameter or thickness. In the case of sterling silver handles the designation of the handle as "sterling" is misleading and unwarranted, because by far the greater part of the weight of the handle so made consists of solder or lead filling.

The present improvement overcomes these objections by providing the tang with a short tubular attaching member firmly swaged upon the tang close to the flange or shoulder of the blade and having a peripheral contour corresponding approximately to the contour of the surrounding portion of the hollow handle.

In the accompanying drawing I have illustrated the details of construction of the flatware piece embodying my invention and also illustrated the method of assembling and securing together the handle and the blade portions of the flatware piece, in this case a knife.

In the drawing

Fig. 1 shows the various parts of the completed knife in their unassembled position.

Fig. 2 shows the parts assembled together with the strip or film of solder fused to firmly secure the handle and the blade in permanent relation.

Fig. 3 is a cross sectional view through the tubular attaching member showing the tang, the attaching piece, the film of solder and the handle in their permanent assembled relation.

In the practice of the invention as illustrated in the drawing, the blade member 1 is provided with an integral shoulder or flange member 1ª and a projecting attaching tang 2. The transverse face of the flange or shoulder 1ª is finished to a flat surface.

I also provide a tubular attaching piece 3, which may be made of brass, copper or any suitable material, forced or swaged by means of a swaging die or the like over the tang into abutment with the flat face of the shoulder 1ª. The contour or periphery of the attaching piece 3 corresponds approximately to the contour of the open end portion of the hollow handle 5. The tubular piece may be drilled or bored to form an approximately circular opening, while the shank according to the usual practice is slightly irregular in form, being longer on one diameter than on the diameter perpendicular thereto. As the blade members, including the tang, are made of steel, when the tubular attaching piece or sleeve is forced along the tang to the base of the tang it is virtually swaged upon the tang, making a very secure and permanent connection between these two parts. A thin sheet sheet of solder 4 is wrapped around the exterior of the tubular attaching piece 3 or the solder may be applied in other ways, such for example as in the form of a tubular sleeve the sheet or sleeve being somewhat longer than the attaching piece 3.

The hollow handle 5 is then pushed on over the tubular piece and the surrounding sheet or sleeve of solder until its open end edge abuts firmly against the flat face of the shoulder or flange 1ª of the blade member. A fusing temperature is then applied to that portion of the handle surrounding the tubular piece 3 and to the flange until the solder is fused, the fused solder 4ª filling every crack or space between the open end portion of the handle and the tubular attaching piece and the blade flange, so that the parts are firmly soldered together. As the film of solder is very thin, just sufficient to make the soldering connection, and as the blade tang is firmly swaged upon the shank there is no loosening or yield of the shank in the handle, while every crack of the joint being filled with the fused solder there is no possibility of leakage of liquid into the interior of the handle.

It will be seen that the tubular attaching sleeve, instead of extending practically the whole length of the tang, need extend only a short distance from the flat end face of the blade at the base of the tang and therefore there is provided a very much lighter and better balanced handle than was obtainable under the old method of manufacture.

Furthermore, as the attaching sleeve is made not only of lighter metal than the heavy lead solder but is made of firmer metal securely swaged upon the base portion of the shank, the tendency of the tang to work loose from the soft solder is eliminated. Since the central bore of the attaching sleeve is preferably made of cylindrical form while the diameter of the tang in the plane of the blade is slightly greater than the transverse diameter thereof, there are formed small narrow spaces on either side of the tang into which the solder will readily flow, thus providing not only the swaged connection but also a film of solder as an additional means of securing the tang and the attaching sleeve together. The only solder used is in the form of a thin film that fills the crevices between the hollow handle, the attaching sleeve and the end face of the handle and the end face of the blade and also the small interstices between portions of the tang and the attaching sleeve. This thin film of solder between the two relatively firm or hard metallic surfaces adds but a trifle to the weight of the article and forms a thoroughly dependable connecting joint. As the tang is made of steel ends non-circular in contour, the forcing of the attaching sleeve, preferably of brass or copper, upon the tang by means of a swaging die suffices to secure the sleeve on the tang against rotative displacement, while the intervening thin film of solder adds additional reenforcement against longitudinal displacement of the tang in the sleeve.

As the same kind of tang projecting from the flat end of the blade is used in forks and other devices having hollow metallic handles, the term "blade" is used generically as applicable either to a cutting blade or to a fork or other member that is attached to such a handle.

What I claim is:

The described improvement in the art of making hollow handle flatware consisting of a blade member and a hollow handle, which comprises giving the tang a uniform cross-sectional non-circular shape and size from end to end, forcing an attaching sleeve of initial circular bore onto the tang in a direction longitudinally thereof, assembling the hollow handle on the sleeve with solder intervening between the handle and sleeve and extending into the handle somewhat beyond the sleeve end and then applying a solder-fusing heat to the open end portion of the handle to bond the attaching sleeve to the handle and to cause the excess solder to flow into the joint between the tang and attaching sleeve.

WILLIAM E. WEST.